Nov. 22, 1938.  W. E. HAUTALA  2,137,910
PNEUMATIC TIRE
Filed June 14, 1937   2 Sheets-Sheet 2
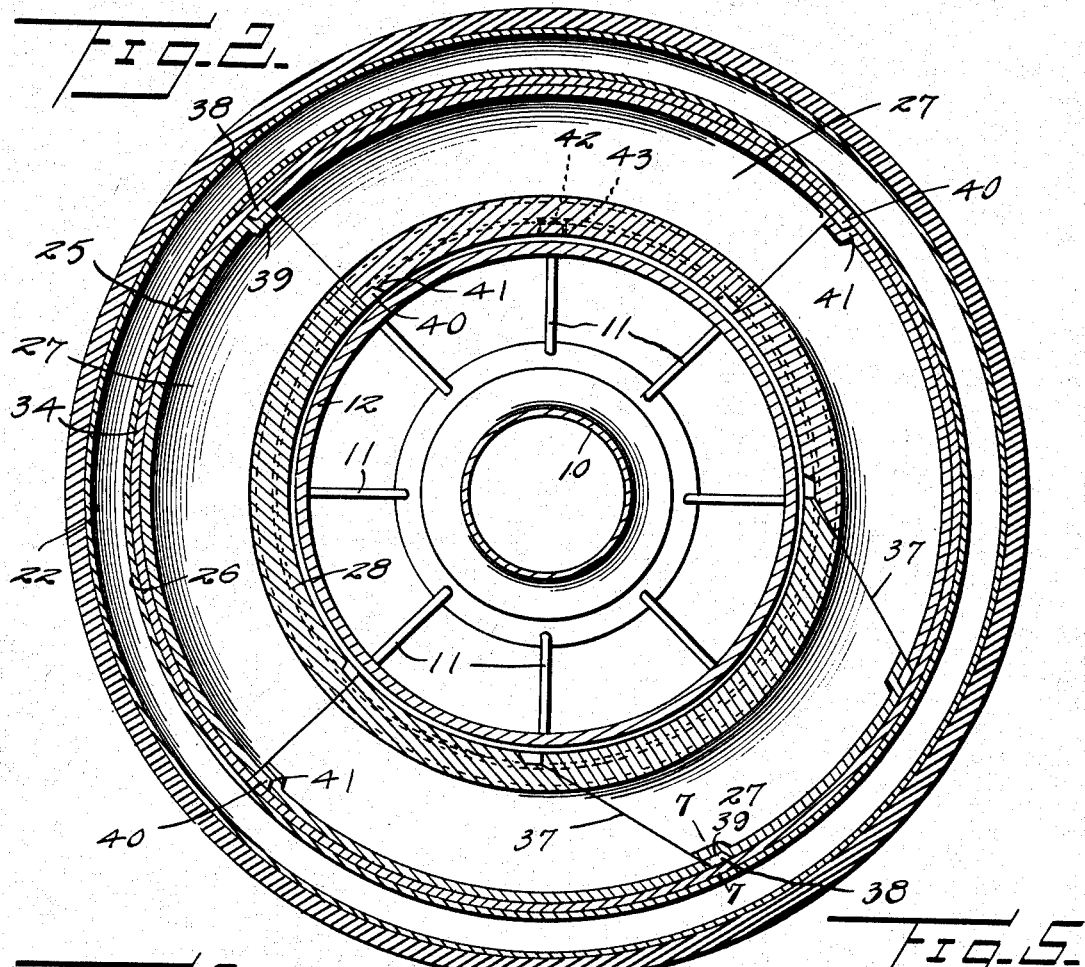
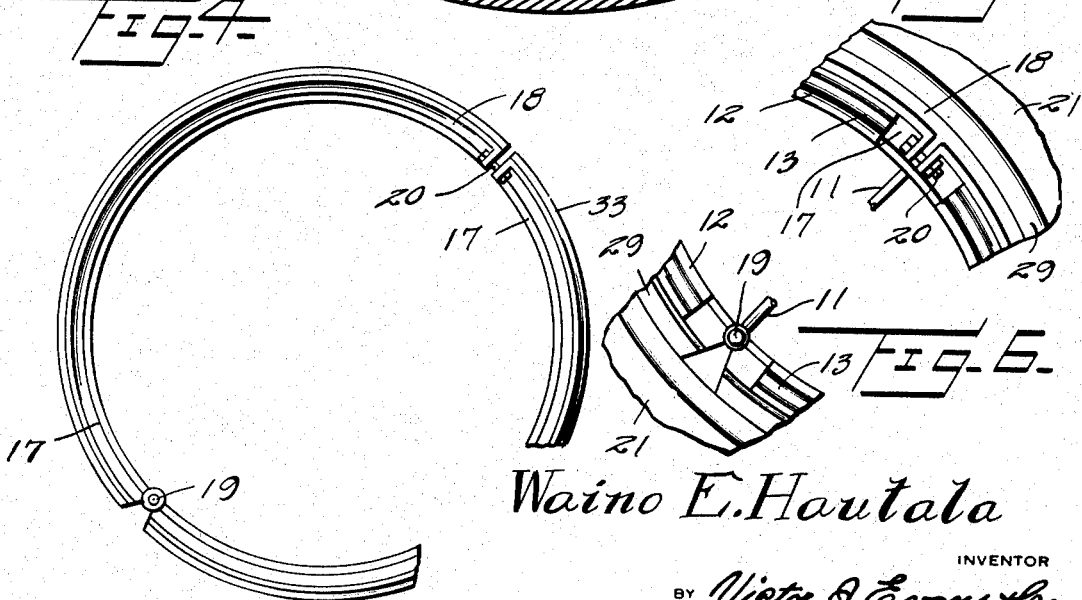
Waino E. Hautala
INVENTOR
BY Victor J. Evans & Co.
ATTORNEY Patented Nov. 22, 1938

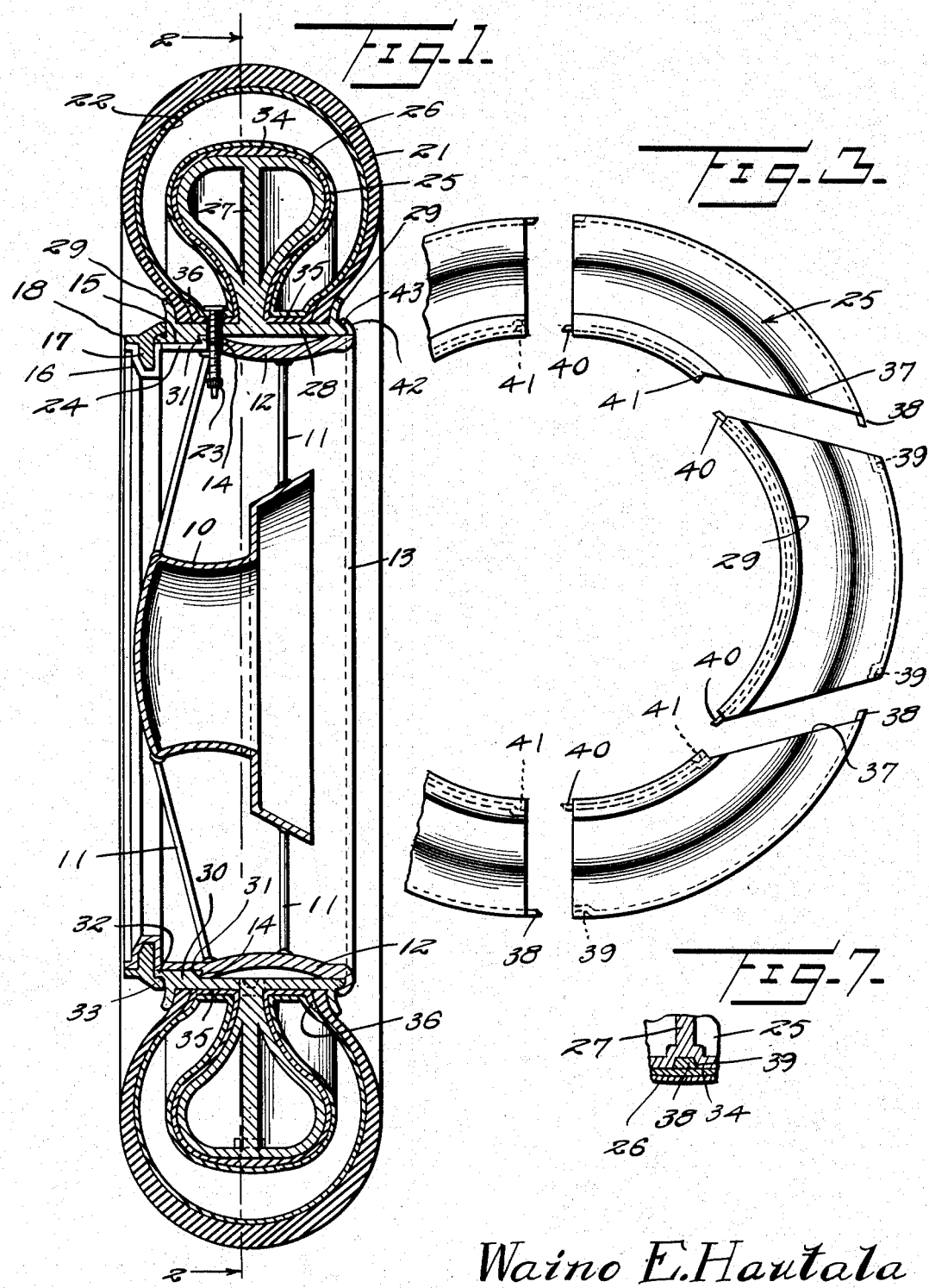

2,137,910

UNITED STATES PATENT OFFICE 2,137,910

PNEUMATIC TIRE

Waino E. Hautala, Ironwood, Mich.

Application June 14, 1937, Serial No. 148,215

1 Claim. (Cl. 152—158)

This invention relates to pneumatic tires and has for an object to provide an inner annular rigid rail for preventing collapse of the tire in the event of a puncture or blow out.

A further object is to provide a pneumatic tire inner tube of horse shoe shape in cross section and a rigid rail adapted to be embraced by the inner tube and adapted to support the weight of a vehicle in the event of puncture or blow-out whereby the driver is enabled to run the vehicle for a reasonable period of time without damaging the tire.

A further object is to provide a pneumatic tire of this type which will be formed of a few strong and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1 is a cross sectional view of a wheel and pneumatic tire thereon, constructed in accordance with the invention.

Figure 2 is a longitudinal sectional view of the wheel and tire taken on the line 2—2 of Figure 1.

Figure 3 is a fragmentary side elevation of the annular rail showing the sections separated.

Figure 4 is a side elevation of the locking ring.

Figure 5 is a detail side elevation showing the locking rim, draw bolt thereof, and adjacent parts of the wheel and pneumatic tire.

Figure 6 is a fragmentary side elevation showing the hinge of the locking ring and adjacent parts of the wheel and pneumatic tire.

Figure 7 is a detail cross sectional view taken on the line 7—7 of Figure 2 showing the tongue and groove connection between two sections of the annular rail and showing the central web of the rail.

Referring now to the drawings in which like characters of reference designate similar parts in the various views, 10 designates the hub, 11 the spokes and 12 the rim of a motor vehicle wheel. The rim is provided on one side with a flange 13 and on the opposite side is provided with a dove-tail shoulder 14. Beyond the shoulder the rim is substantially annular in contour as shown at 15 and outwardly of the annular portion of the rim is provided with a channel 16.

The channel receives the flange 17 of a locking ring 18, formed of two sections, as best shown in Figure 4, hinged together at two adjoining ends as shown at 19 and removably connected together opposite the hinge by a draw bolt 20.

The novel pneumatic tire comprising the subject matter of this invention comprises a conventional tire casing 21 within which is disposed an inner tube 22 of horse shoe shape in cross section. The inner tube is provided with a conventional inflating valve 23 which projects through a slot 24 in the wheel rim to promote easy assembly and disassembly of the tire and wheel.

An annular rail 25 is embraced by the inner tube and this rail is of the general cross sectional shape of the inner wall 26 of the inner tube and is sufficiently rigid to support the latter in normal position in the event of a puncture or a blow-out so that the vehicle does not become unmanageable by reason of a deflated tire.

The annular rail 25 is formed of metal and is hollow so as to be light in weight. The rail is provided with a central reinforcing web 27 which strengthens the structure to withstand load strains in the event of a deflated tire.

The rail is provided at the base with a metal rim 28 which is received on the rim 12 of the wheel and is provided with flanges 29 at the sides to bear against the bead portions of the casing 21 in the customary manner. The rim 28 is provided with a rib 30 on the inner periphery which is supported upon the annular portion 15 of the wheel rim 12. The rib is provided with a dove-tail wall 31 which engages the dove-tail shoulder 14 on the wheel rim and also is provided with a flange 32 which engages underneath the retaining lip 33 of the locking ring 18.

A liner strip 34 is interposed between the inner wall 26 of the inner tube and the surface of the annular rail. The liner strip is provided with annular side portions 35 which are interposed between the inner periphery of the inner tube and the base rim 28 of the annular rail. The edge portions 36 of the liner strip are interposed between the inner tube and the bead portions of the casing, as best shown in Figure 1.

By referring now to Figure 3 it will be seen that the annular rail 25 is formed of a plurality of sections preferably having the end faces 37 disposed obliquely across the rail to promote strength at the joints. The sections are properly aligned by interfitting guide lugs 38 formed on certain of the sections and sockets 39 formed on others of the sections, at the outer periphery. At the inner periphery similar interfitting guide lugs 40 and sockets 41 are provided.

In assembling the tire and rail the sections of the rail are placed successively in the enclosure of the inner wall 26 of the inner tube and then the assembled inner tube and rail may be placed within the casing 31. The tire may now be applied to the wheel rim 12 in the conventional manner with the base rim 28 of the annular rail bearing upon the wheel rim. The locking ring 18 may now be applied in the channel 16 of the wheel rim and the draw bolt 20 tightened to wedge the tire in place.

By referring to Figure 1 it will be seen that a lug 42 is disposed on the rim 12 and engages in a slot 43 formed in the wheel rim 12. The lug and slot connection between the rim and the wheel prevents slipping of the rim on the wheel circumferentially.

From the above description it is thought that the construction and operation of the invention will be fully understood without further explanation.

What is claimed is:

The combination with a vehicle wheel having a rim, a tire on the rim, and an annular rigid rail on the rim for supporting the weight of the vehicle when the tire is deflated, of a base flange integral with the rail seated on the rim, an annular rib extending from the inner face of the base flange and fitting in an annular recess in the rim, said rim preventing lateral displacement of the rail when the weight of the vehicle is borne thereby after deflation of the tire, flanges on the sides of the base flange adapted to engage the tire; said base flange projecting on one side beyond the tire engaging flange thereof, a clamping flange on the same side of said rim engaged over said projecting portion of the base flange, and a clamp ring carried by the rim and engaged against the opposite side of said base flange.

WAINO E. HAUTALA.